No. 687,126. Patented Nov. 19, 1901.
H. O. CEASE.
FIRE ESCAPE.
(Application filed Apr. 26, 1901.)
(No Model.) 2 Sheets—Sheet 1.
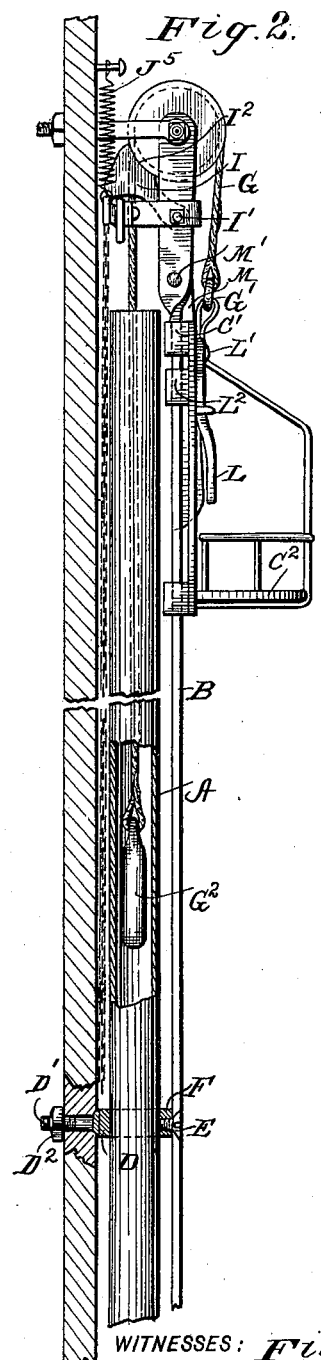
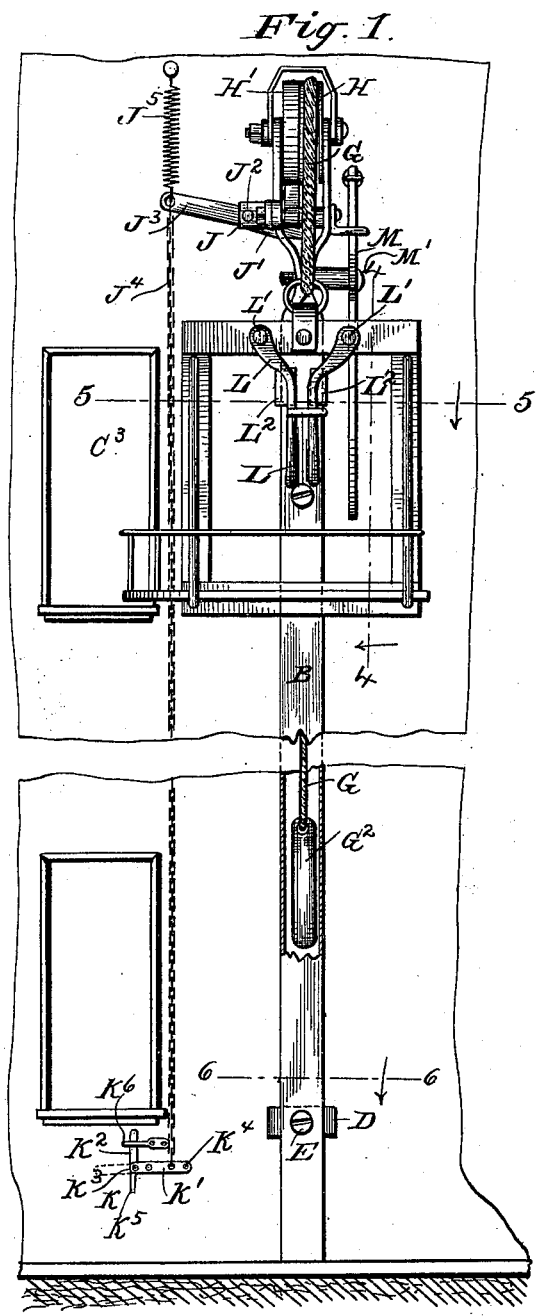
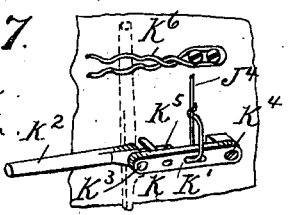
WITNESSES:
W. R. Edelin
Perry B. Turpin
INVENTOR
Henry O. Cease
BY Munn & Co.
ATTORNEYS No. 687,126. Patented Nov. 19, 1901.
H. O. CEASE.
FIRE ESCAPE.
(Application filed Apr. 26, 1901.)
(No Model.) 2 Sheets—Sheet 2.
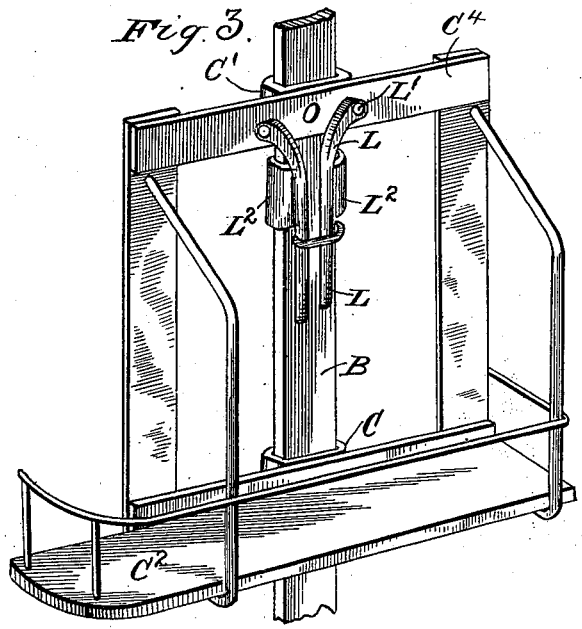
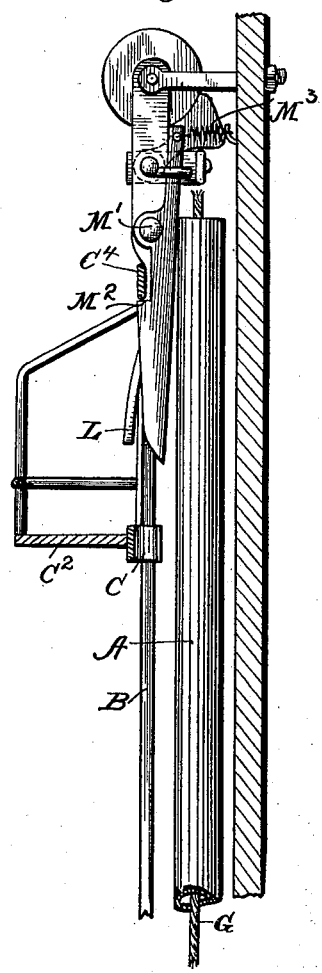
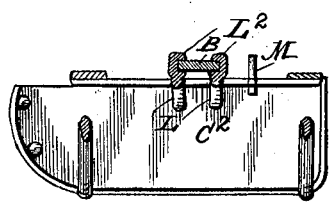
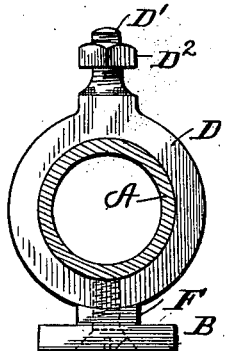
WITNESSES:
W. R. Edelen
Perry B. Turpin
INVENTOR
Henry O. Cease
BY Munn & Co.
ATTORNEYS

UNITED STATES PATENT OFFICE.

HENRY O. CEASE, OF LOUISA, KENTUCKY, ASSIGNOR OF ONE-THIRD TO CONRAD WAITS, OF CATLETTSBURG, KENTUCKY.

FIRE-ESCAPE.

SPECIFICATION forming part of Letters Patent No. 687,126, dated November 19, 1901.

Application filed April 26, 1901. Serial No. 57,573. (No model.)

*To all whom it may concern:*

Be it known that I, HENRY O. CEASE, a citizen of the United States, residing at Louisa, in the county of Lawrence and State of Kentucky, have made certain new and useful Improvements in Fire-Escapes, of which the following is a specification.

My invention is an improvement in fire-escapes, and has for an object to provide a novel construction of car and guiding, supporting, and operating devices therefor, whereby the car can be readily raised to any suitable height and can be lowered under the control of the occupants of the car or of persons on the ground, as may be desired; and the invention consists in certain novel constructions and combinations of parts, as will be hereinafter described and claimed.

In the drawings, Figure 1 is a front view of my improved fire-escape. Fig. 2 is a side view thereof, partly in section. Fig. 3 is a detail perspective view of the car. Fig. 4 is a detail sectional view on about line 4 4 of Fig. 1. Fig. 5 is a detail cross-section on about line 5 5 of Fig. 1. Fig. 6 is a detail cross-section on about line 6 6 of Fig. 1, and Fig. 7 is a detail view of the lever by which the brake is operated from the ground.

In carrying out my invention I provide an upright having a guideway or casing A for the counterbalance-weight and a bar B, forming a track for the car C, which is provided at C' with portions embracing and sliding upon the said bar, as shown in Figs. 1, 2, and 3. The casing A and bar B are preferably connected together, as shown in Fig. 6, by means of a collar D, which encircles the casing A and is provided with a bolt D' and nut $D^2$, whereby it may be secured in place, as shown in Fig. 2. The bar B is secured to the collar D by means of a screw E, passed through the bar B and into the collar D, the bar B being preferably sufficiently far from the collar to permit the desired operation of the car up and down upon the bar B in raising and lowering the car. The car is adapted to support persons escaping from the building and is preferably provided with a lateral extension at $C^2$, which opens at the rear of the car and may extend adjacent to a window $C^3$ in the use of the escape, as will be understood from Fig. 1. The car is carried on a rope G, secured at one end G' to the car, extending thence up over a pulley H and down within the casing A and supporting the weight $G^2$, as shown in Figs. 1 and 2. The pulley H is supported in a suitable frame and is arranged for engagement by a brake I, operated from the ground. To this end the pulley H is preferably provided with a brake-surface H', and the brake I is in the form of a shoe pivoted at I', so its surface $I^2$ can be adjusted against or clear of the brake-surface H', and such shoe is arranged for engagement by one arm J' of a lever J, which is pivoted at $J^2$ and has its arm $J^3$ connected with the line $J^4$, which extends near to the ground, and is connected with a hand-lever K, which is jointed, as shown in Figs. 1 and 7, as will be more fully described. By this lever K the brake I may be operated to press upon the pulley H, and a spring $J^5$ is arranged to retract the lever J, as will be understood from Fig. 1.

The lever K is composed of two sections K' and $K^2$, which are pivoted together at $K^3$, the section K' being pivoted at $K^4$ and connected with the line $J^4$, while the handle-section $K^2$ is provided with an extension $K^5$, which abuts the section K' when the lever is adjusted, as shown in dotted lines, Fig. 1, for operating the brake, or the handle-section may be turned up, as shown in full lines, Fig. 1, and engaged with a suitable holder $K^6$ when it is not desired to use the said lever K in setting the brake. By the described construction the car can be braked from the ground and controlled by a fireman or other person stationed at such point.

In order to control the car from the car itself, I provide brake-levers L, which are pivoted at L' at their upper ends to the framing of the car and extend thence downward on opposite sides of the bar B and are provided at $L^2$ with brake-shoes engaging the opposite edges of the bar B, the lower ends of the levers L being slightly outturned and arranged to be pressed toward each other to force the shoes $L^2$ tightly against the bar B and so control the descent of the car. On the building, adjacent to the point where it is desired to rescue persons, I provide a detent for holding the car while it is being loaded with passengers. This detent is shown as a latch M in the form of a bar pivoted at M' to a support connected with the building and shouldered at M² to engage with a cross-bar C⁴ on the car, a spring M³ being provided to hold the latch in engagement with said bar, as will be understood from Fig. 4. The weight G² operates to counterbalance the car, ease the descent, and facilitate the raising thereof, the ascent and descent of the car being controlled from the ground by means of the brake I and its operating devices. When raised to the position shown in Fig. 1, the car will be held by the latch until loaded, when the latch may be released by pushing its lower end toward the building, and the car may descend under the control of the brake I or the brake L, or both.

Having thus described my invention, what I claim, and desire to secure by Letters Patent, is—

1. The fire-escape herein described comprising the casing, the guide-bar held thereto, the guide-pulley at the upper end of said bar and casing, the latch adjacent to the point whence it is desired to rescue persons, the car provided with guides engaging the guide-bar and slidable thereon, the brake-levers pivoted to the car and provided with the brake-shoes operating upon the opposite edges of the guide-bar, the counterbalance-weight operating in the casing, and the cord or connection extending over the guide-pulley and connecting the said weight with the car substantially as set forth.

2. In a fire-escape the combination of the upright casing, an upright guide-bar connected therewith, a guide-pulley at the upper end of said casing, a counterbalance-weight operating in the casing, the car having guide devices slidably interlocked with the upright guide-bar and securing the car slidably to the latter, the side of the car opposite the guide-bar being free or unobstructed, and the cord or connection passed over the guide-pulley and connecting the counterbalance-weight and the car, substantially as set forth.

3. The combination substantially as herein described of the vertically-movable car, the upright guide-bar therefor, the brake-levers pivoted to the car, extending in front of the upright bar and the shoes carried by said levers and embracing the opposite edges of the guide-bar and arranged to be pressed into engagement with the said bar substantially as set forth.

4. In a fire-escape the combination of the tubular casing for the counterbalance-weight, the upright bar forming a guide for the car, a collar encircling the casing and provided with an extended bolt for connection with the supporting structure, means for securing the upright bar to said collar, the counterbalance-weight and car and the operating and controlling devices substantially as set forth.

HENRY O. CEASE.

Witnesses:
A. M. HUGHES,
W. D. ROFFE.